No. 750,902. Patented February 2, 1904.

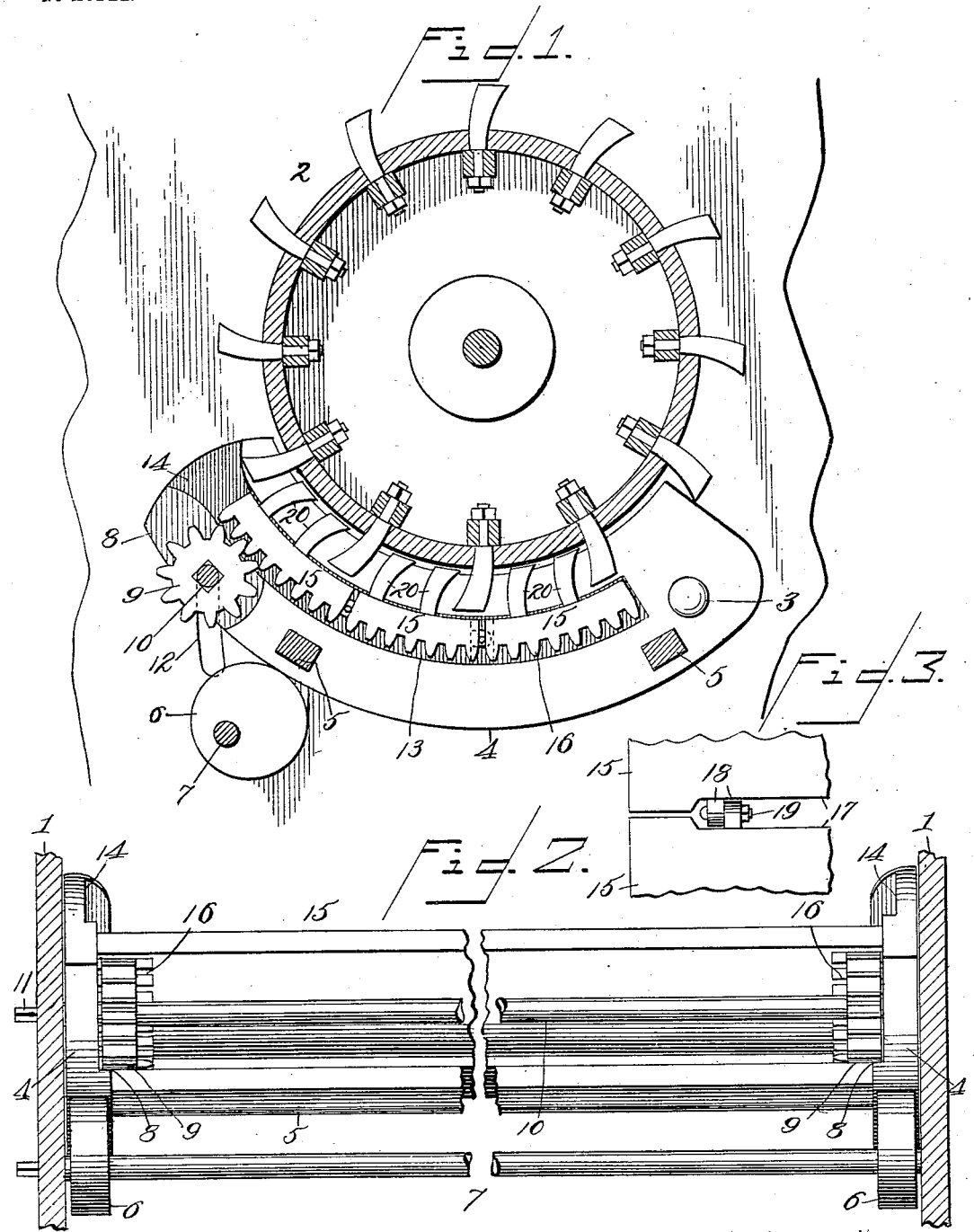

UNITED STATES PATENT OFFICE.

ALBERT A. SHELTON AND ROBERT A. KIRK, OF SALINA, KANSAS.

THRESHING-MACHINE CONCAVE.

SPECIFICATION forming part of Letters Patent No. 750,902, dated February 2, 1904.

Application filed May 12, 1903. Serial No. 156,792. (No model.)

*To all whom it may concern:*

Be it known that we, ALBERT A. SHELTON and ROBERT A. KIRK, citizens of the United States, residing at Salina, in the county of Saline and State of Kansas, have invented certain new and useful Improvements in Threshing-Machine Concaves, of which the following is a specification.

This invention relates to threshing-machines, and more especially to improve concaves therefor, and has for its object to provide a structure of this character which may be easily and expeditiously secured in or removed from operative position.

A further object is to produce a concave possessing the feature of advantage enumerated, which is of simple, strong, durable, and cheap construction.

To these ends the invention consists in certain novel and peculiar features of construction and combinations of parts, as hereinafter described and claimed, and in order that it may be fully understood reference is to be had to the accompanying drawings, in which—

Figure 1 is a vertical section taken longitudinally of the thresher and inward of one of the side walls of the concave-framework, so as to disclose the end of the concave proper and one of the actuating cog-wheels in elevation. Fig. 2 is a broken front view with the cylinder omitted. Fig. 3 is a top plan showing one of the connections between two concave-sections.

In the said drawings, 1 designates the side walls of a threshing-machine, and 2 the usual or any preferred cylinder therein. Secured to the walls of the thresher are hinge-bolts 3, the same being disposed below the cylinder and rearward of its axis, and hinged or pivoted upon said bolts, so as to swing vertically, is a concave-framework, the same comprising similar side walls 4, connected near their lower margins by cross-bars 5, and said hinged framework rests forward of the cylinder-axis upon a pair of eccentrics 6 on shaft 7, journaled in side walls 1, and adapted to be turned in any suitable or preferred manner, it being also understood that any suitable mechanism may be used to secure the eccentrics at the desired point of adjustment.

At their front ends and inner sides the slots 4 are recessed, as at 8, and fitting in said recesses are cog-wheels 9, mounted on a cross-shaft 10, journaled in the side walls and having one end prolonged, as at 11, and projecting through a slot 12 in the proximate thresher-wall 1, said slot being concentric of the hinge-bolts in order to accommodate the projecting end of said shaft when the concave as a whole is raised by the eccentrics or permitted to swing downward by the proper operation of said eccentrics. The eccentric-shaft is adapted to be rotated and secured at any desired point in its rotation by any suitable or preferred means.

The walls of the framework are provided in their inner sides with segmental grooves 13 deeper than and communicating with recesses 8 and having their front ends flaring, as at 14, for a purpose which hereinafter appears, said grooves being of such curvature as to extend approximately concentric of the cylinder-axis when the concave occupies its operative position, as shown, and of such length as to extend nearly to the rear end of the framework.

The concave proper fits slidingly at its opposite sides in grooves 13 and is in the form, preferably, of a plurality of sections 15, provided at their lower side margins with rack-teeth 16, engaging cog-wheels 9 in order that the turning of shaft 10 shall impart sliding movement to the concave in its framework, the concave moving as a whole because the sections are hingedly connected together, and in order that they may be thus connected and at the same time be so disposed relatively that they shall form a continuous rack-bar, as shown in Fig. 1, they are recessed in their contiguous faces, as at 17, and provided with oppositely-projecting lugs 18, the lugs of one section projecting into the registering recesses of the proximate section and being connected to the contiguous lugs of said section by pivot-bolts 19, as shown most clearly in Fig. 3.

From the upper side of each section of the concave projects the usual teeth 20, which coöperate with the teeth of the cylinder in threshing the grain.

In securing this concave in position its rear end is slipped into the flaring end of grooves 13 and then either slid back to operative position by means of the rotation of shaft 10 or else if said shaft is free to rotate is simply pushed back to such position. After the concave proper attains operative position in its framework the latter is swung upward to operative relation with the cylinder by means of the eccentrics, as hereinbefore explained. The parts are now ready for the threshing operation.

When it is desired to remove the concave proper, shaft 10 is properly operated, so as to slide the concave forwardly. As the first section of the latter emerges from the framework it swings downward by gravity on its hinged connection with the following section, so that it can be disconnected from the latter, if desired, or so that it can be more conveniently grasped and drawn forward out of the machine, the other section or sections following the same route as they successively emerge from the flared end of slots 13.

From the above description it will be apparent that a concave for threshing-machines has been produced which not only possesses the advantages enumerated as desirable in the statement of invention, but which also permits a broken or injured section to be cheaply, easily, and quickly replaced without the aid of a skilled mechanic, and while the preferred embodiment of the invention has been illustrated and described it is to be understood that such changes in the form, proportion, detail construction, and arrangement of the parts may be made as do not involve a departure from the essential spirit and scope or sacrifice any of the advantages of the invention.

Having thus described the invention, what we claim as new, and desire to secure by Letters Patent, is—

1. A concave, comprising a framework having in its inner sides opposite arc-shaped slots which are open at their front ends, a concave proper, consisting of sections having their ends fitting slidingly in said slots, and hinged together so as to be capable of swinging vertically as they successively emerge from the slotted framework, and a wheel geared to the lower or convex side of the concave and adapted by rotation to successively engage the sections and move the concave rearwardly or forwardly.

2. A concave comprising a framework hinged to swing vertically, a concave proper slidingly mounted in said framework, and provided with a continuous series of teeth, and a shaft journaled in said framework and provided with a cog-wheel engaging said teeth.

3. A concave comprising a framework hinged to swing vertically, a concave proper slidingly mounted in said framework, and provided with a continuous series of teeth, a shaft journaled in said framework and provided with a cog-wheel engaging said teeth, and eccentrics for raising said framework.

4. The combination of a threshing-machine having hinge-bolts, and a slot concentric of said bolts, a cylinder, and a concave, comprising a framework hinged to operate vertically on said bolts, below the cylinder, a shaft carried by the framework and projecting at one end through said slot, and provided with a cog-wheel, and a concave proper mounted in the framework and provided with a continuous series of rack-teeth engaging said cog-wheel.

5. The combination of a threshing-machine having hinge-bolts, and a slot concentric of said bolts, a cylinder, and a concave, comprising a framework hinged to operate vertically on said bolts below the cylinder, a shaft carried by the framework and projecting at one end through said slot and provided with a cog-wheel, a concave proper, mounted in the framework and provided with a continuous series of rack-teeth engaging said cog-wheel, and eccentrics underlying said framework to raise the concave to operative relation with the cylinder.

In testimony whereof we affix our signatures in the presence of two witnesses.

ALBERT A. SHELTON.
ROBERT A. KIRK.

Witnesses:
A. L. TAYLOR,
GAL. TAYLOR.